US005664242A

United States Patent [19]
Takagi

[11] Patent Number: 5,664,242
[45] Date of Patent: Sep. 2, 1997

[54] AUTOMATIC EXPOSURE DEVICE AND PHOTOMETRY DEVICE IN A CAMERA

[75] Inventor: Tadao Takagi, Yokohama, Japan

[73] Assignee: Nikon Corporation, Tokyo, Japan

[21] Appl. No.: 702,856

[22] Filed: Aug. 26, 1996

Related U.S. Application Data

[63] Continuation of Ser. No. 274,370, Jul. 13, 1994, abandoned, which is a continuation of Ser. No. 91,821, Jul. 13, 1993, abandoned.

[30] Foreign Application Priority Data

Jul. 22, 1992 [JP] Japan .................... 4-195499

[51] Int. Cl.⁶ .................................................. G03B 7/08
[52] U.S. Cl. .................... 396/234; 396/268; 396/273
[58] Field of Search ........................ 348/243; 396/268, 396/273, 234

[56] References Cited

U.S. PATENT DOCUMENTS

| | | | |
|---|---|---|---|
| 3,179,808 | 4/1965 | Grey et al. | 354/429 |
| 3,904,818 | 9/1975 | Kovac | 358/160 |
| 4,476,383 | 10/1984 | Fukuhara et al. | 354/432 |
| 4,567,525 | 1/1986 | Endo et al. | 358/213.17 |
| 4,703,442 | 10/1987 | Levine | 358/163 |
| 4,705,382 | 11/1987 | Mukai et al. | 354/432 |
| 4,739,495 | 4/1988 | Levine | 358/163 |
| 4,870,443 | 9/1989 | Hayakawa et al. | 354/432 |

FOREIGN PATENT DOCUMENTS

1-288735  11/1989  Japan .

*Primary Examiner*—Russell E. Adams

[57] ABSTRACT

An automatic exposure device in a camera divides an object field into a plurality of areas and photometers them by the use of a divisional photometry element, and calculates optimum exposure from the result of the photometry. The divisional photometry element includes a photometric converting portion for photoelectrically converting incident light in each of the areas and putting out an output, and a reading portion for reading out the plurality of outputs of the photoelectric converting portion. When the number of successive outputs of a row of the areas in the readout direction which exceed a predetermined value is greater than a predetermined number, the output of that row is completely omitted in the calculation of the optimum exposure.

33 Claims, 10 Drawing Sheets

AUTOMATIC EXPOSURE DEVICE AND PHOTOMETRY DEVICE IN A CAMERA

This application is a continuation, of application Ser. No. 08/274,370, filed Jul. 13, 1994, now abandoned, which is a continuation of application Ser. No. 08/091,821, filed Jul. 13, 1993, now abandoned.

BACKGROUND OF THE INVENTION

1. Field of the Invention

This invention relates to an automatic exposure device and a photometry device in a camera wherein an object field is divided and photometered.

2. Related Background Art

As a device of this kind, there has heretofore been a device as disclosed, for example, in Japanese Laid-Open Patent Application No. 1-288735. This device is such that a plurality of photoelectric conversion elements are disposed in a package and the object field is divide and photometered by them to thereby obtain optimum exposure.

However, the prior-art device as described above is of a type in which the outputs of the photoelectric conversion elements are read out as electric currents and therefore, is of such structure that wiring is led from each photoelectric conversion element to an amplifier, and for the convenience of wiring, the number of divisions could only be less than one hundred.

In contrast with such a limitation, there is conceived a method of using a CCD image sensor or an MOS image sensor in which the outputs of photoelectric conversion elements are accumulated as charges for a predetermined time and the accumulated charges are successively read out.

However, in the sensor of the type as described above in which the accumulated charges are read out, the photoelectric conversion elements are connected together through a reading portion, and this has led to a problem that when very high luminance is incident on some of the photoelectric conversion elements to cause an overflow, it affects the outputs of that row or the area around it. If the affected outputs are intactly used for exposure calculation, exposure will greatly deviate from the optimum value.

SUMMARY OF THE INVENTION

So, it is the object of the present invention to provide an automatic exposure device in a camera wherein even when very high luminance is incident on some photoelectric conversion elements to cause an overflow and it affects the outputs of that row or the area around it, optimum or nearly optimum exposure is obtained.

To achieve the above object, in a first aspect of the present invention, a photoelectric conversion portion and a reading portion for reading out the output of the photoelectric conversion portion are arranged in a lattice-like form on a divisional photometry element so that when a predetermined number of or more outputs of a predetermined value or greater exist adjacent to one another in any one row in the readout direction, all of the outputs of that row may not be used for the calculation of the optimum exposure value.

In a second aspect of the present invention, a first photoelectric conversion portion for photometering the brightness of the object field, a second photoelectric conversion portion having its surface shielded from light and measuring a dark signal, and a reading portion for reading out the outputs of the first and second photoelectric conversion portions are arranged in a lattice-like form on a divisional photometry element so that when the output from the second photoelectric conversion portion is equal to or greater than a predetermined value, the output of the divisional photometry element may not be used for the calculation of the optimum exposure value.

In the present invention, when very high luminance is incident on some photoelectric conversion elements to cause an overflow and it affects the outputs of that row or the area around it, the affected outputs can be omitted in the calculation of exposure and therefore, even in such a case, it becomes possible to obtain optimum or nearly optimum exposure.

DESCRIPTION OF THE PREFERRED EMBODIMENTS

Figure 1:
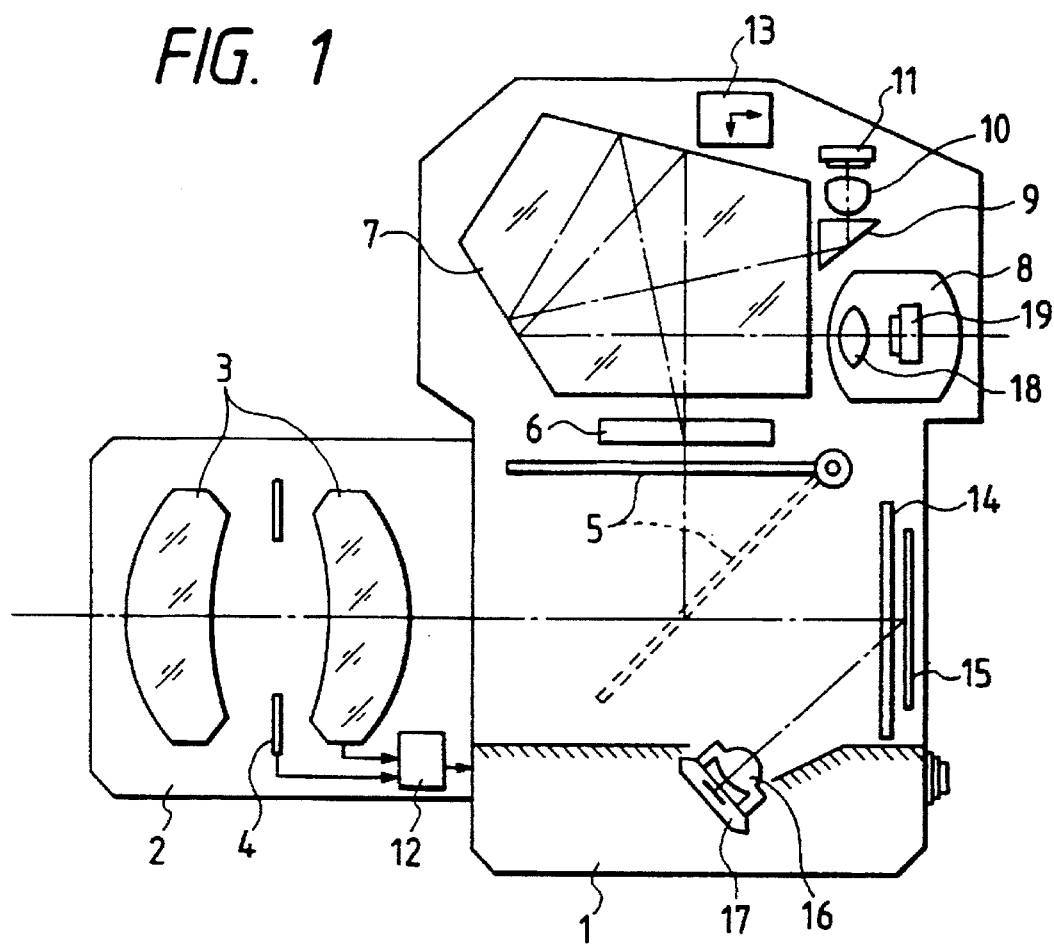
FIG. 1 is a cross-sectional view of a camera having an automatic exposure device according to the present invention.
Figure 4:
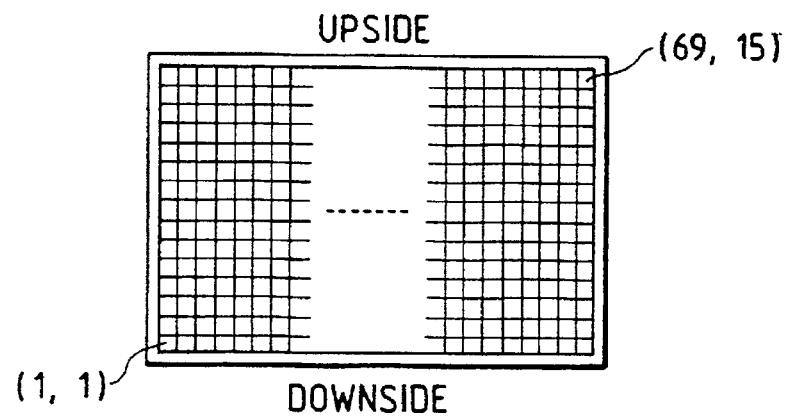
FIG. 4 shows a division pattern when the luminance in the image field is photometered.
Figure 5:
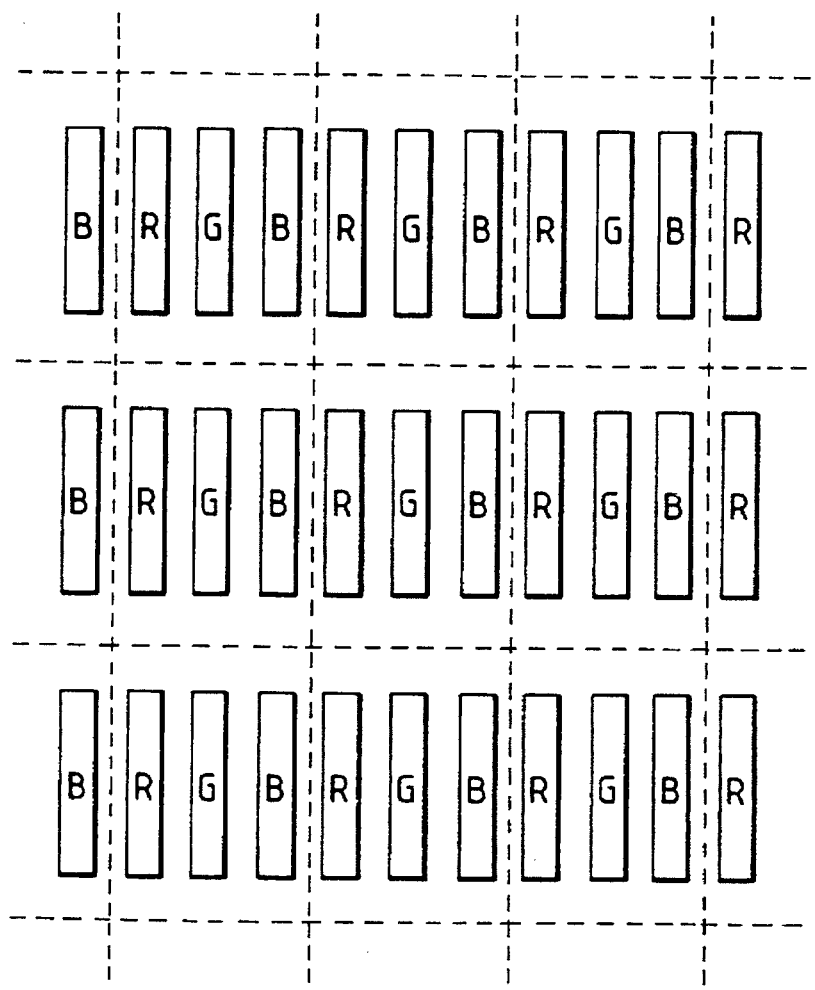
FIG. 5 shows the arrangement of color filters placed on the photoelectric conversion elements of the photometry element 11.

FIG. 1 is a cross-sectional view of a camera having an automatic exposure device according to the present invention. During finder observation, a light beam from the object field passes through a taking lens 3 and stop 4 in a taking lens barrel 2, is reflected by a main mirror 5 (in its dotted-line state) in a camera body 1, and passes through a screen 6, a pentagonal prism 7 and an eyepiece 8 to the photographer's eye. A part of the light beam passes through the pentagonal prism 7 and through a prism 9 and a condensing lens 10 to a photometry element 11. The photometry element 11 is a colored two-dimensional CCD used in a video camera or the like and has a structure that can divide the object field into 69 divisions (widthwise)×15 divisions (lengthwise), totalling 1035 divisions, as shown in FIG. 4, can photometer luminance, and can measure colors by the repetitive arrangement of filters of three colors, R, G and B as shown in FIG. 5.

Another part of the light beam passes through the pentagonal prism 7 and through a condensing lens 18 to a photometry element 19. The photometry element 19 is an SPD conventionally used for photometry in a camera, and the output thereof is read as an electric current. The purpose of this photometry element 19 is to change over the photometry element from 11 to 19 when very high luminance is incident on some of the photoelectric conversion elements of the photometry element 11 to cause an overflow that affects the outputs of many areas. The photometry element 19 in the present embodiment divides the object field into five areas and photometers them, but may also be an element of the single photometry type.

ROM 12 in the lens communicates photographing distance information X obtained from the position of the taking lens 3 and lens data such as the aperture value information of the stop 4 to the camera body 1.

Posture detecting means 13 detects the posture of the camera body 1.

A photometry element 17 is a flash photometering element used for flash control when flash means is used. A light beam emitted from the flash device is reflected by the object field and passes through the taking lens 3, the stop 4 and a shutter 14, and is reflected by a film surface 15 and passes through a condensing lens 16 to the flash photometering photometry element 17.

Figure 2:
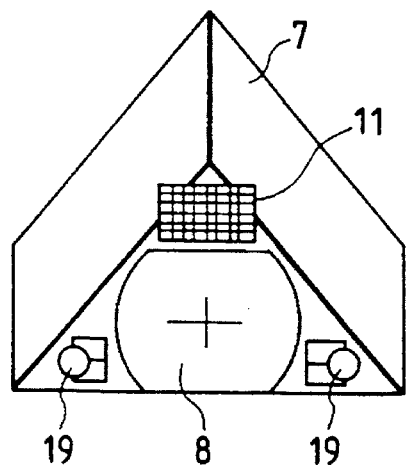
FIG. 2 shows a first embodiment of the arrangement of photometry elements 11 and 19.

FIG. 2 shows a first embodiment of the arrangement of the photometry elements 11 and 19. This figure is a view of the pentagonal prism 7 as it is seen from the eyepiece 8 side, and primarily intends to illustrate the arrangement, and therefore, the directions, etc. of the elements are depicted somewhat differently from those in FIG. 1. The photometry element 11 photometers by the use of the light beam above the eyepiece 8, while the photometry element 19 photometers by the use of the light beams at the right and left side of the eyepiece. Photometry is effected with the photometry element divided into the central portion and four areas around it, totalling five areas, and with regard to the central portion, a pair of right and left elements are superposed one upon the other on the photometering area, whereby the outputs are combined to provide the output of the central portion.

Figure 3:
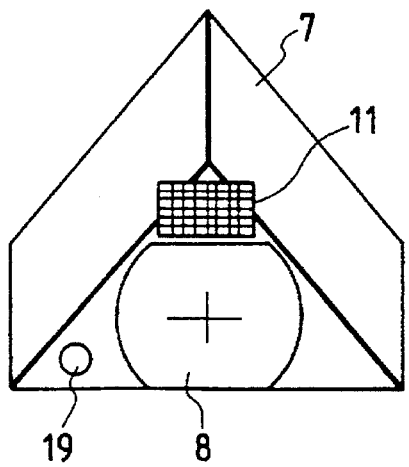
FIG. 3 shows a second embodiment of the arrangement of photometry elements 11 and 19.

FIG. 3 shows a second embodiment of the arrangement of the photometry elements 11 and 19. This figure is a view of the pentagonal prism 7 as it is seen from the eyepiece 8 side, and primarily intends to illustrate the arrangement, and therefore, the directions, etc. of the elements are depicted somewhat differently from those in FIG. 1. The photometry element 11 photometers by the use of the light beam above the eyepiece 8, while the photometry element 19 photometers by the use of the light beam at the left side of the eyepiece. Photometry is effected in a single area without the photometry element being divided into a plurality of areas.

FIG. 4 shows a division pattern when the luminance in the image field is photometered. The photometry element 11 divides the luminance of the object field image on the screen 6 through the condensing lens 10, as shown, and photometers it. The division pattern is 1035 divisions, i.e., 69 divisions (widthwise)×15 divisions (lengthwise). As regards the addresses of the respective areas, with the camera body 1 levelled in its lateral position, the left side of the downside is (1, 1) and the right side of the upside is (69, 15).

FIG. 5 shows the arrangement of color filters placed on the photoelectric conversion elements of the photometry element 11.

On the 1035 divided areas illustrated in FIG. 4, there are repetitively arranged filters of three colors, R, G and B as shown in FIG. 5, whereby the light can be resolved into three primary colors and photometered. The three colors of the filters need not always be three primary colors, R, G and B, but may also be complementary colors.

Figure 6:
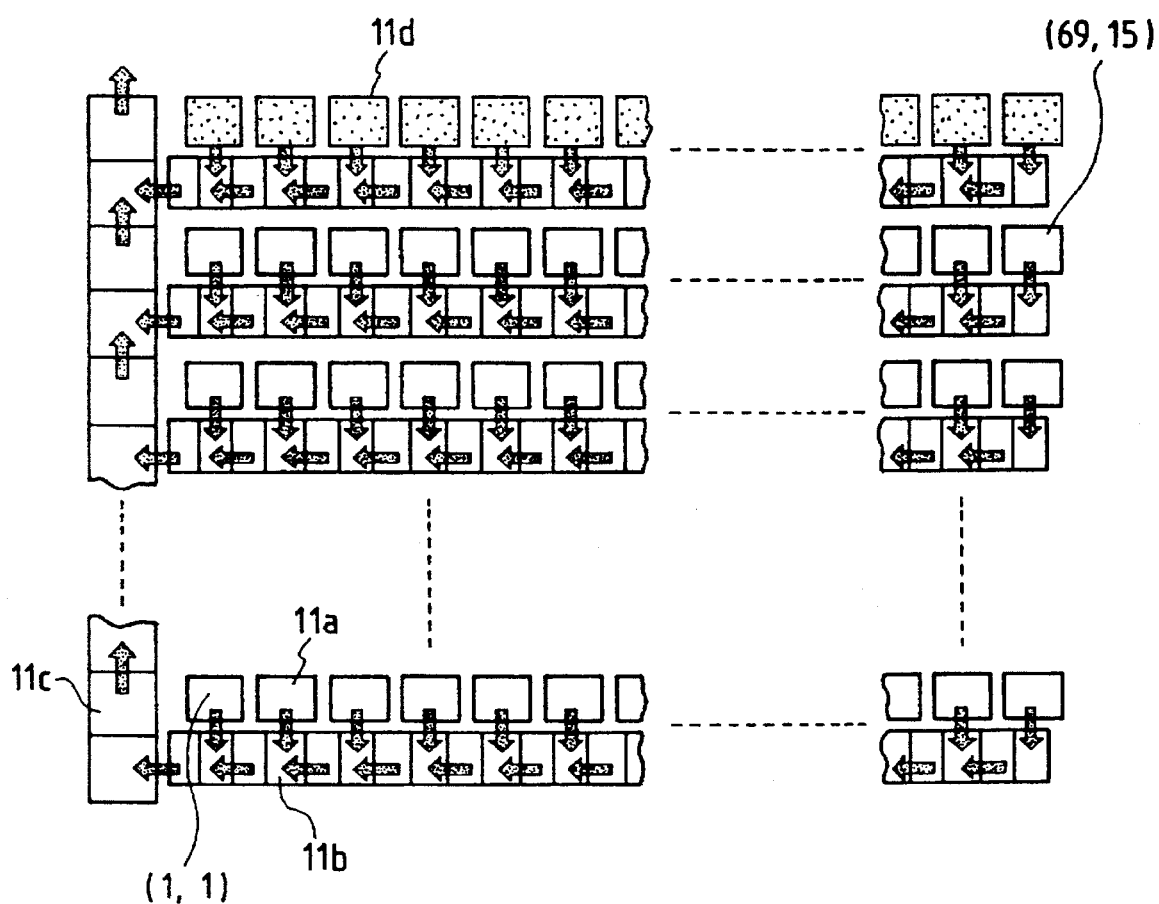
FIG. 6 shows the structure of the photometry element 11.

FIG. 6 shows the structure of the photometry element 11.

Photoelectric conversion elements (photodiodes) 11a are arranged in 69 rows and in 15 columns. Shift registers (called H registers) 11b are under each row, and charges created by the photoelectric conversion by the photoelectric conversion elements 11a are accumulated in an accumulation portion, not shown, for a predetermined time, thereafter they are transferred to the H registers at the same time. The H registers transfer the charges successively in the leftward direction in accordance with a clock pulse. There is a V register 11c at the left ends of the H registers, and this V register 11c upwardly transfers the charges transferred from each H register 11b, converts them into a voltage by floating diffusion, not shown and thereafter outputs it to an amplifier.

Optical black portions (OPB) 11d are the surfaces of the photoelectric conversion elements 11a which are shielded from light, and dark signals are output therefrom. This structure is identical to what has been described above, except for the portions shielded from light, and the reading method is also similar to what has been described above. By the amount of the dark signals being subtracted from the outputs of the photoelectric conversion elements 11a, the correction of the amount corresponding to the dark signals is effected.

When a light beam of high luminance exceeding a predetermined quantity is incident on some of the photoelectric conversion elements 11a, an overflow is caused and affects the outputs of the other elements in the rows including the elements on which the light beam of high luminance is incident, through the H registers. Further, if the amount of the overflow is great, it may affect even the other H registers through the V register.

Figure 7:
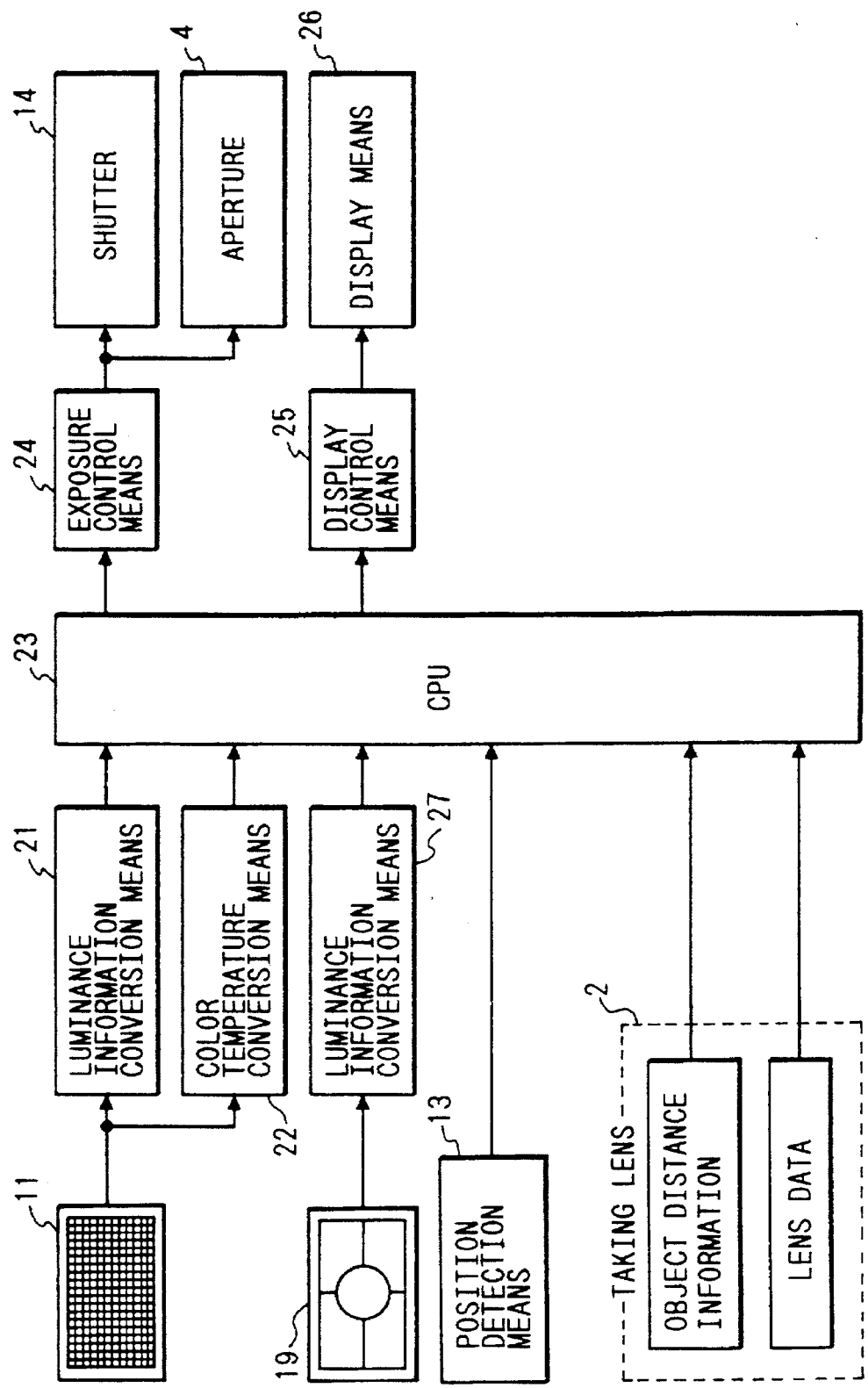
FIG. 7 is a block diagram of the present invention.

FIG. 7 is a block diagram of the present invention.

The output LV(m, n) of the photometry element 11, on the one hand, is converted into a luminance value BV(m, n) by conventional luminance information conversion means 21 and input to a CPU 23, and on the other hand, is converted into a color temperature CT by conventional color temperature conversion means 22 and input to the CPU 23. The substance of the conventional color temperature conversion means 22 will be described later with reference to FIGS. 8–10.

The output CV(n) of the photometry element 19 is converted into a luminance value DV(n) by conventional luminance information conversion means 27 and input to the CPU 23.

Position detection means 13 detects the position of the camera body 1 and inputs the result of the detection to the CPU 23. Specifically, the result of the position detection is classified into three positions, i.e., a lateral position, a vertical position in which the pentagonal prism 7 lies at the right side, and a vertical position in which the pentagonal prism 7 lies at the left side.

Object distance information X obtained from the position of the taking lens 3 and lens data such as the aperture value information of the stop 4 are input from the taking lens barrel 2 to the CPU 23 in the camera body 1.

The CPU 23 calculates an optimum exposure value BVans on the basis of the above-mentioned information input thereto, and displays it on display means 26 through display control means 25. The calculation of the optimum exposure value BVans will be described later with reference to FIGS. 11 and so on.

Thereafter, a release button, not shown, is depressed, whereby exposure control means 24 drives the shutter 14 and stop 4 and controls them to the calculated exposure value BVans.

Figure 8:
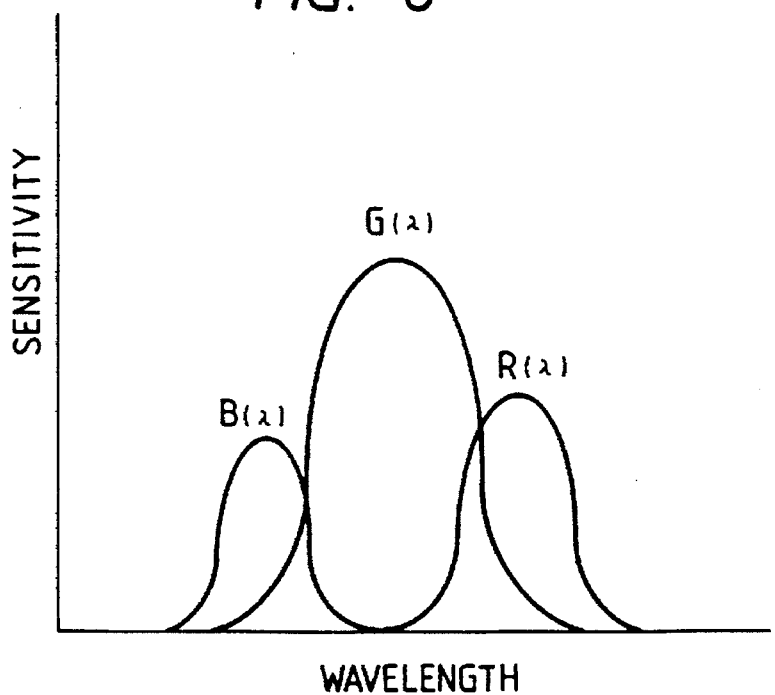
FIG. 8 is a graph showing the spectral sensitivity characteristics of the three colors of FIG. 5.
Figure 9:
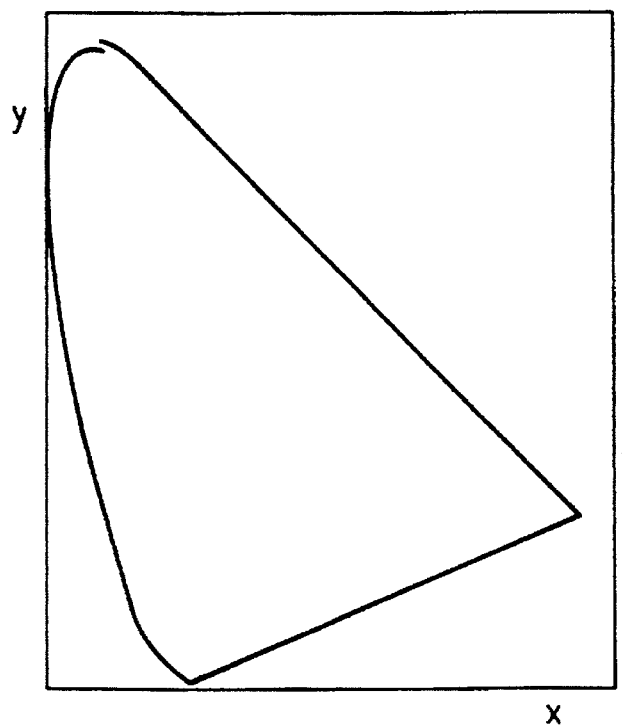
FIG. 9 shows xy chromaticity.
Figure 10:
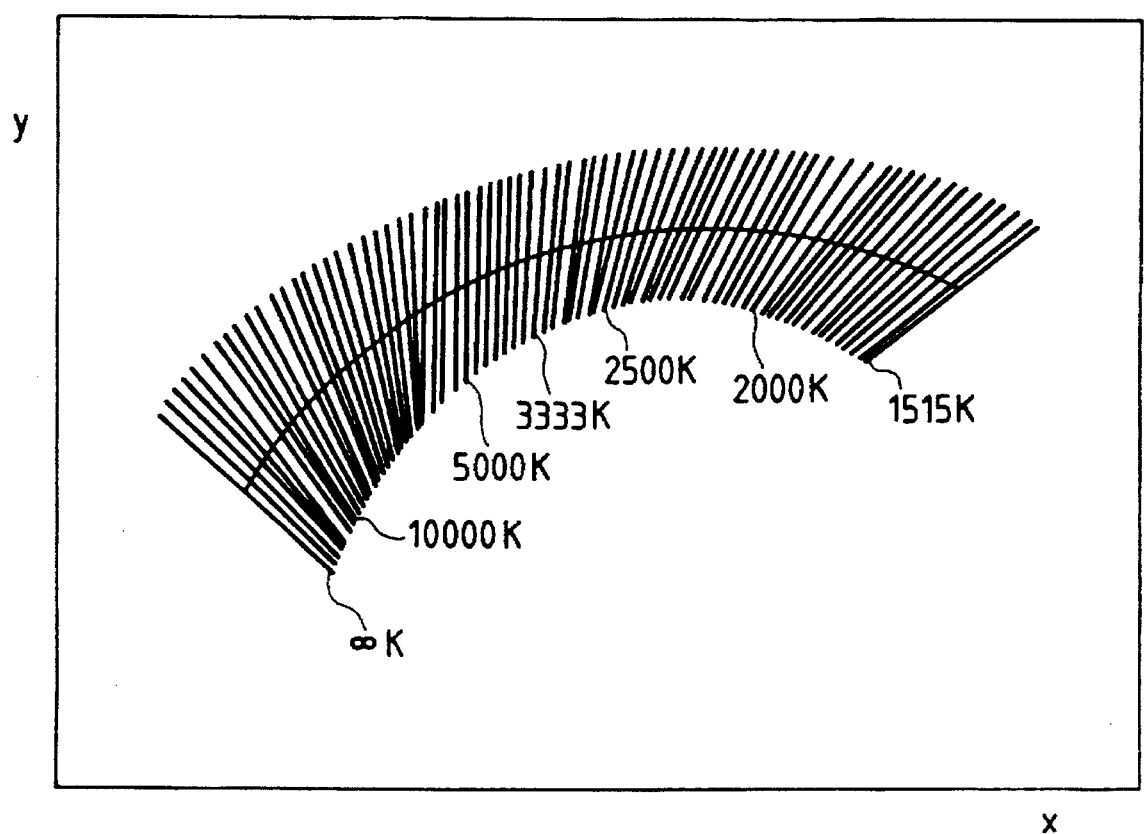
FIG. 10 shows blackbody locus and isochromatic temperature lines.

FIGS. 8 to 10 illustrate the principle of the color temperature conversion means 22 of FIG. 7.

FIG. 8 shows the spectral sensitivity characteristics of the three colors of FIG. 5. In FIG. 8, the axis of abscissa represents wavelength and the axis of ordinate represents sensitivity. The sensitivity of red is represented by $R(\lambda)$, the sensitivity of green is represented by $G(\lambda)$ and the sensitivity of blue is represented by $B(\lambda)$.

When the outputs from light receiving portions having the sensitivities $R(\lambda)$, $G(\lambda)$ and $B(\lambda)$ are defined as X, Y and Z, respectively, chromaticity coordinates xy are found from the following equations:

$$x=X/(X+Y+Z)$$

$$y=Y/(X+Y+Z)$$

FIG. 9 is an xy chromaticity diagram. All colors lie inside or on the line of the horseshoe shape, and the color of that area is found from the value of xy found from the above-mentioned equations.

FIG. 10 represents blackbody locus and isochromatic temperature lines.

On which isochromatic temperature line the color rides is examined from the value of xy found from the above-mentioned equations, whereby the color temperature is found.

In the present embodiment, 345 color temperatures corresponding to one third of 1035 areas, i.e., 345 areas, are found, and the color temperature conversion means 22 finds the color temperature of the whole by the addition average of them.

Figure 11:
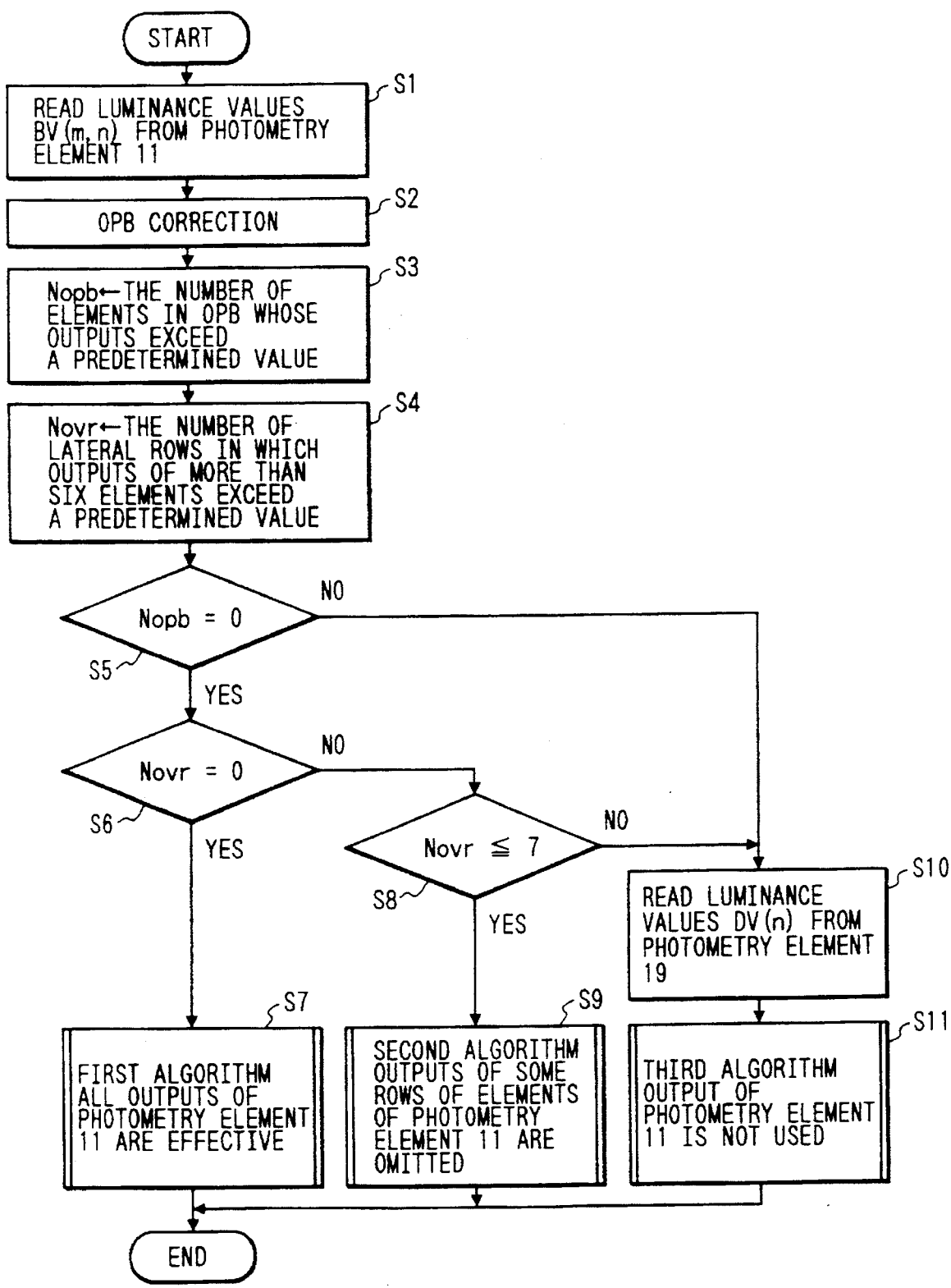
FIG. 11 is a diagram representing the main algorithm of the CPU 23 of FIG. 7.

FIG. 11 represents the main algorithm of the CPU 23 of FIG. 7.

At a step S1, the luminance values BV(m, n) photometered by the photometry element 11 and converted by the luminance information conversion means 21 are read.

At a step S2, the dark signal measured by the optical black portions 11d is subtracted from the luminance values BV(m, n) and OPB correction is effected.

At a step S3, the number of elements in the row of optical black portions 11d (the row of OPB) whose outputs exceed a predetermined value is counted and defined as Nopb. The predetermined value is set to a value about twice as great as the expected maximum value of the dark signal. In a usual state, the outputs from the optical black portions 11d are of a small value of the dark signal level. However, when intense light is incident on any one photoelectric conversion element 11a and the illuminance of the element surface exceeds a limit value, a great quantity of charges created therein overflows and passes through the H registers in that row to the V register and flows into the H registers in the other rows and destroys the other data. At this time, the charges also flow into the H registers in the row of OPB and therefore, the outputs thereof assume a great value far exceeding the level of the dark signal, and it can be discriminated that there is the possibility of all data having been destroyed (affected).

At a step S4, the number of lateral rows (the direction of H registers) in which the outputs of seven or more elements exceed a predetermined value is counted and defined as Novr. The predetermined value refers to a value lower by about 1 EV than the upper limit value of photometry determined by the controllable shortest accumulation time and sensitivity, and is of the order of 10000 lux in terms of element surface illuminance. The level at which the overflow occurs is higher than this upper limit value of photometry, and is a value about 100 to 1000 times as high as that and therefore, cannot be measured as a matter of course. Also, seven corresponds to a little less than 4 mm in terms of the image field of a 35 mm single-lens reflex camera, and corresponds to a case where the sun is photographed by a telephoto lens having a focal length of the order of 400 mm. Accordingly, it can be discriminated that when the outputs of seven or more elements exceed the upper limit value of photometry, there is the possibility of an overflow having occurred and the data of that lateral row (the direction of H registers) having been destroyed.

Subsequently, when at a step S5, Nopb=0 and at a step S6, Novr=0, some of the elements overflow, whereby it is judged that there is no possibility of the outputs of the other elements which are not overflowing having been affected, and advance is made to a step S7, where the calculation of the optimum exposure value is effected by a first algorithm. The first algorithm calculates with all the outputs of the photometry element 11 as being effective, and the details thereof will be described later with reference to FIG. 12.

When at the step S5, Nopb=0, but at the step S6, Novr≠0, advance is made to a step S8, where whether Novr is 7 or less is discriminated. If Novr is 7 or less, that is, if Novr is half of the total 15 rows or less, advance is made to a step S9, where the calculation of the optimum exposure value is effected by a second algorithm. The second algorithm calculates while omitting the data of the lateral rows in the photometry element 11 which have been affected by the overflow, and the details thereof will be described later with reference to FIG. 13.

Also, when at the step S5, Nopb≠0 or when at the step S8, Novr exceeds 7, advance is made to a step S10, where the luminance value DV(n) of the photometry element 19 is read. Advance is then made to a step S11, where the calculation of the optimum exposure value is effected by a third algorithm. The third algorithm judges that the data of the photometry element 11 are all untrustable, and changes them over to the data of the photometry element 19 and calculates the latter data, or substitutes a predetermined value for the data of the photometry element 11, and the details thereof will be described later with reference to FIG. 14. The photometry element 19 is an SPD conventionally used in the photometry of a camera, and the outputs thereof are read from respective independent routes and therefore, by the overflow from some of the elements thereof, the outputs of the other elements are not destroyed, as are the CCDs used in the photometry element 11.

Figure 12:
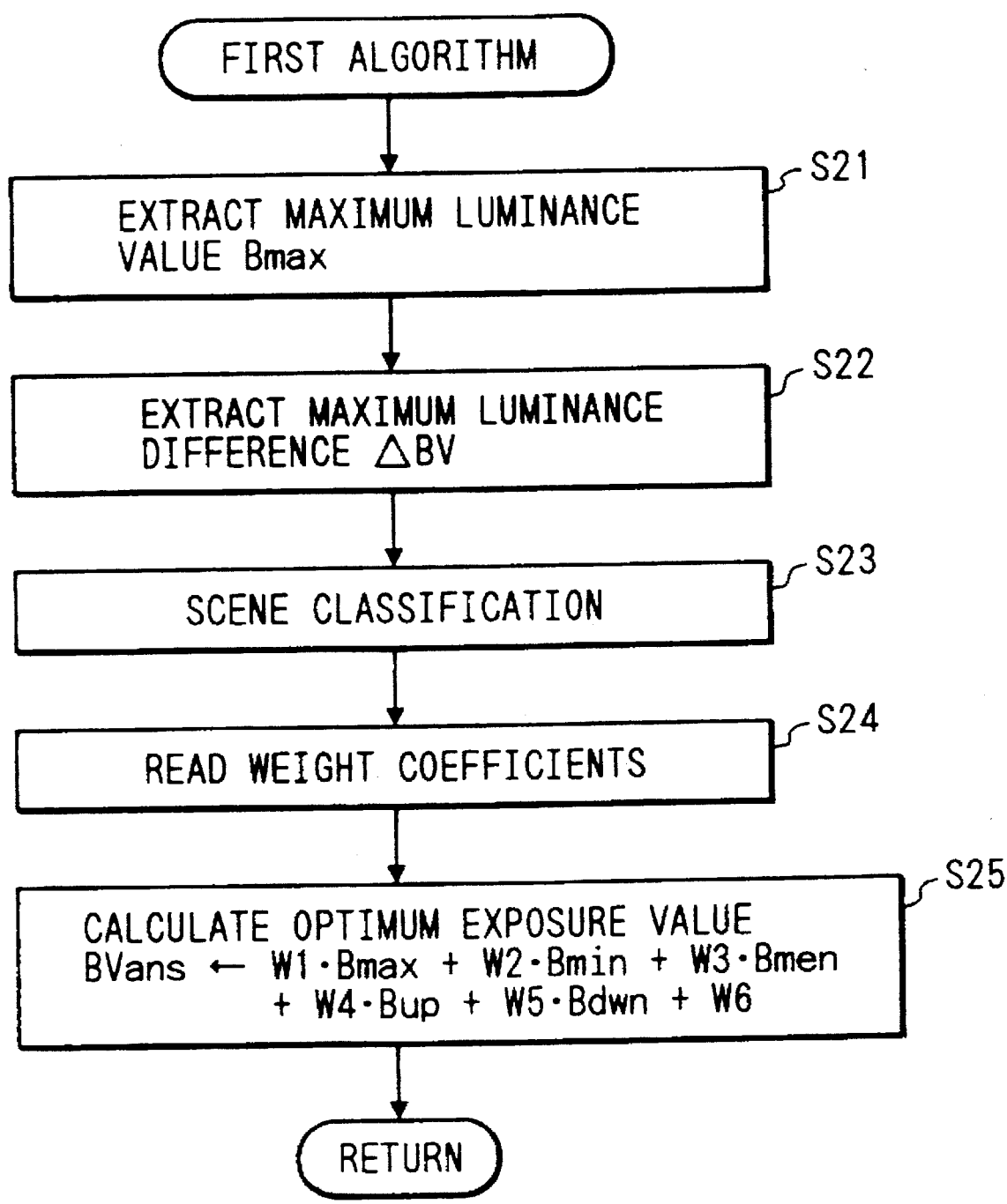
FIG. 12 is a detailed diagram of a first algorithm.

FIG. 12 shows the details of the first algorithm.

At a step S21, a maximum luminance value Bmax is extracted from among 1035 luminance value data divisionally photometered by the photometry element 11.

At a step S22, a maximum luminance difference value $\Delta BV$ is extracted from among 1035 luminance value data divisionally photometered by the photometry element 11.

At a step S23, scene classification is effected in accordance with the scene classification of Table 1 in which the maximum luminance value Bmax, and the maximum luminance difference value $\Delta BV$ are used in parameters. For example, when the maximum luminance value Bmax is 6 and the maximum luminance difference value $\Delta BV$ is 3, the scene is classified as scene "SC-5".

At a step S24, on the basis of the classified scene, six weight coefficients W1–W6 are read from Table 2. For example, when the scene is classified as SC-5, W51 is given to W1, W52 is given to W2, W53 is given to W3, W54 is given to W4, W55 is given to W5, and W56 is given to W6.

At a step S25, the optimum exposure value is calculated from the following equation:

$$BVans = W1 \cdot Bmax + W2 \cdot Bmin + W3 \cdot Bmen + W4 \cdot Bup + W5 \cdot Bdwn + W6,$$

where

Bmax: the maximum value among 1035 luminance value data divisionally photometered by the photometry element 11;

Bmin: the minimum value among 1035 luminance value data divisionally photometered by the photometry element 11;

Bmen: the arithmetical mean value of 1035 luminance value data divisionally photometered by the photometry element 11;

Bup: the arithmetical mean value of the data of 8 rows at the upside of the photometry element 11;

Bdwn: the arithmetical mean value of the data of 8 rows at the downside of the photometry element 11.

The discrimination between the upside and the downside is effected by the position detecting means 13.

Figure 13:
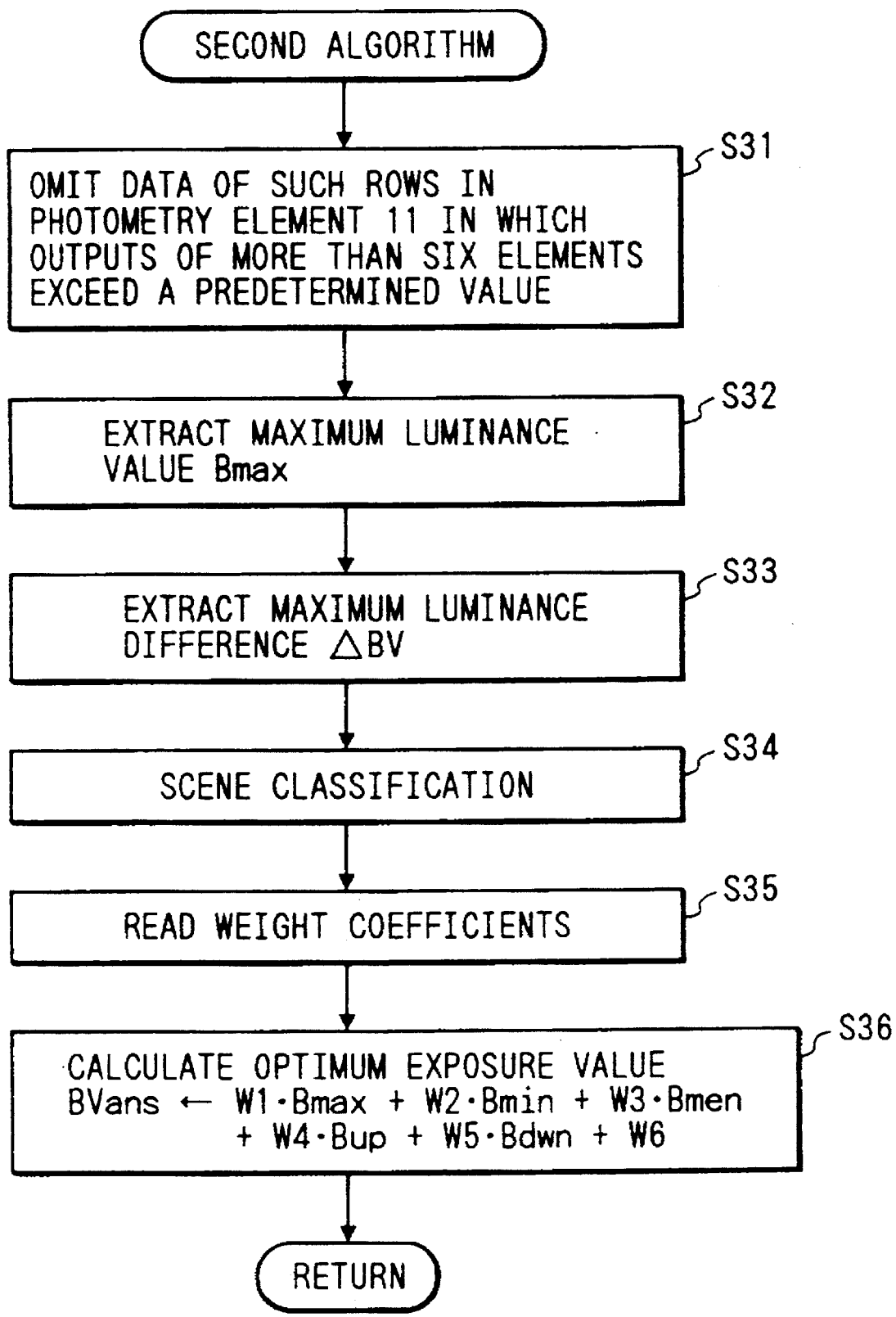
FIG. 13 is a detailed diagram of a second algorithm.

FIG. 13 shows the details of the second algorithm.

At a step S31, the data of such rows in the photometry element 11 in which the outputs of seven or more elements exceed a predetermined value are omitted. The predetermined value refers to the predetermined value described in connection with the step S4 of FIG. 11.

At a step S32, the maximum luminance value Bmax is extracted from among the luminance value data which have been divisionally photometered by the photometry element 11 and have not been omitted at the step S31.

At a step S33, the maximum luminance difference $\Delta BV$ is extracted from among the luminance value data which have been divisionally photometered by the photometry element 11 and have not been omitted at the step S35.

At a step S34, scene classification is effected in accordance with the scene classification of Table 1 in which the maximum luminance value Bmax and the maximum luminance difference value $\Delta BV$ are used as parameters. For example, when the maximum luminance value Bmax is 6 and the maximum luminance difference value $\Delta BV$ is 3, the scene is classified as scene "SC-5".

At a step S35, on the basis of the classified scene, six weight coefficients W1–W6 are read from Table 2. For example, when the scene is classified as SC-5, W51 is given to W1, W52 is given to W2, W53 is given to W3, W54 is given to W4, W55 is given to W5, and W56 is given to W6.

TABLE 1

|  | Bmax | | |
|---|---|---|---|
| $\Delta BV$ | Bmax < 5 | 5 ≦ Bmax < 8 | 8 ≦ Bmax |
| $\Delta BV \leqq 2$ | SC-1 | SC-2 | SC-3 |
| $2 < \Delta BV \leqq 4$ | SC-4 | SC-5 | SC-6 |
| $4 < \Delta BV$ | SC-7 | SC-8 | SC-9 |

TABLE 2

| Scene classification | Weight coefficients | | | | | |
|---|---|---|---|---|---|---|
|  | W1 | W2 | W3 | W4 | W5 | W6 |
| SC-1 | W11 | W12 | W13 | W14 | W15 | W16 |
| SC-2 | W21 | W22 | W23 | W24 | W25 | W26 |
| SC-3 | W31 | W32 | W33 | W34 | W35 | W36 |
| SC-4 | W41 | W42 | W43 | W44 | W45 | W46 |
| SC-5 | W51 | W52 | W53 | W54 | W55 | W56 |
| SC-6 | W61 | W62 | W63 | W64 | W65 | W66 |
| SC-7 | W71 | W72 | W73 | W74 | W75 | W76 |
| SC-8 | W81 | W82 | W83 | W84 | W85 | W86 |
| SC-9 | W91 | W92 | W93 | W94 | W95 | W96 |

At a step S36, the optimum exposure value is calculated from the following equation:

$$BVans = W1 \cdot Bmax + W2 \cdot Bmin + W3 \cdot Bmen + W4 \cdot Bup + W5 \cdot Bdwn + W6,$$

where

Bmax: the maximum value among the luminance value data which have been divisionally photometered by the photometry element 11 and have not been omitted at the step S31;

Bmin: the minimum value among the luminance value data which have been divisionally photometered by the photometry element 11 and have not been omitted at the step S31;

Bmen: the arithmetical mean value of the luminance value data which have been divisionally photometered by the photometry element 11 and have not been omitted at the step S31;

Bup: the arithmetical mean value of the luminance value data among the data of 8 rows at the upside of the photometry element 11 which have not been omitted at the step S31;

Bdwn: the arithmetical mean value of the luminance value data among the data of 8 rows at the downside of the photometry element 11 which have not been omitted at the step S31.

The discrimination between the upside and the downside is effected by the position detecting means 13.

Figure 14:
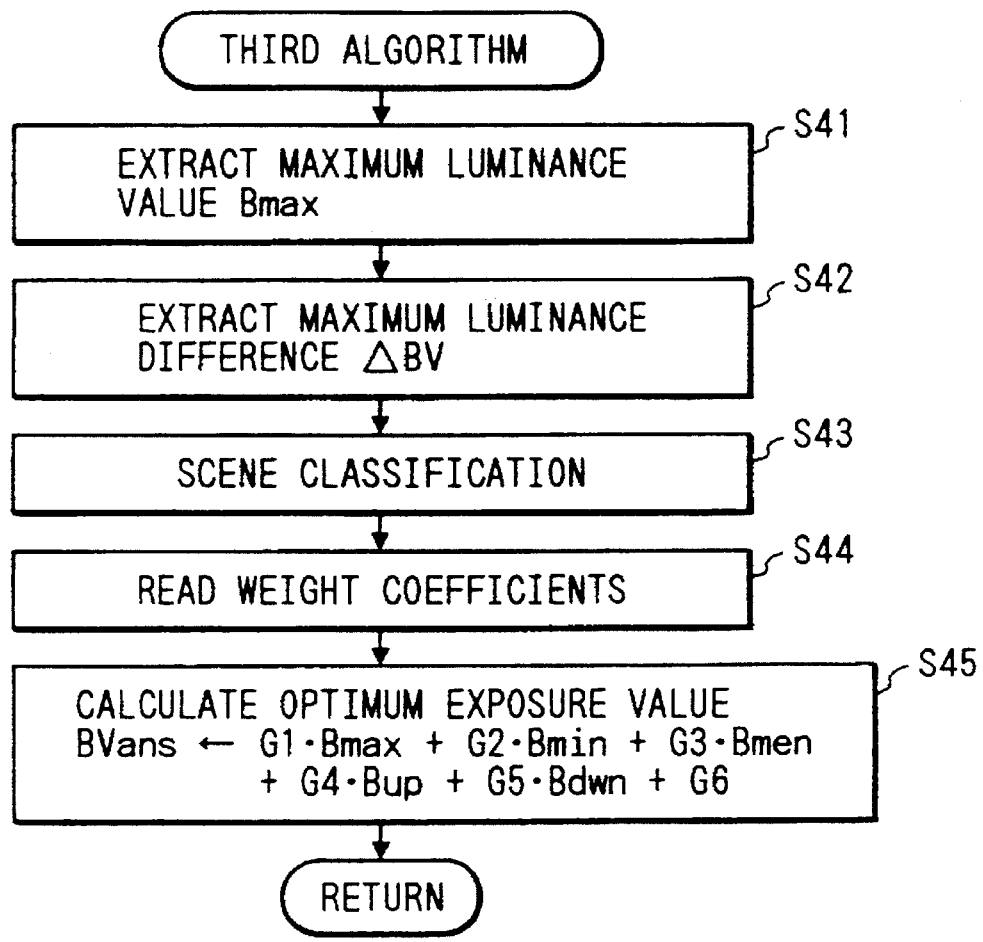
FIG. 14 is a detailed diagram of a third algorithm.

FIG. 14 shows a first embodiment of the details of the third algorithm.

At a step S41, the maximum luminance value Bmax is extracted from among five luminance value data divisionally photometered by the photometry element 19.

At a step S42, the maximum luminance difference value $\Delta BV$ is extracted from among five luminance value data divisionally photometered by the photometry element 19.

At a step S43, scene classification is effected in accordance with the scene classification of Table 1 in which the maximum luminance value Bmax and the maximum luminance difference value $\Delta BV$ are used as parameters. For example, when the maximum luminance value Bmax is 6 and the maximum luminance difference value $\Delta BV$ is 3, the scene is classified as scene "SC-5".

At a step S44, on the basis of the classified scene, weight coefficients G1–G6 are read from Table 3. For example, when the scene is classified as SC-5, G51 is given to G1, G52 is given to G2, G53 is given to G3, G54 is given to G4, G55 is given to G5, and G56 is given to G6.

TABLE 3

| Scene classification | Weight coefficients | | | | | |
|---|---|---|---|---|---|---|
| | G1 | G2 | G3 | G4 | G5 | G6 |
| SC-1 | G11 | G12 | G13 | G14 | G15 | G16 |
| SC-2 | G21 | G22 | G23 | G24 | G25 | G26 |
| SC-3 | G31 | G32 | G33 | G34 | G35 | G36 |
| SC-4 | G41 | G42 | G43 | G44 | G45 | G46 |
| SC-5 | G51 | G52 | G53 | G54 | G55 | G56 |
| SC-6 | G61 | G62 | G63 | G64 | G65 | G66 |
| SC-7 | G71 | G72 | G73 | G74 | G75 | G76 |
| SC-8 | G81 | G82 | G83 | G84 | G85 | G86 |
| SC-9 | G91 | G92 | G93 | G94 | G95 | G96 |

At a step S45, the optimum exposure value is calculated from the following equation:

$$BVans = G1 \cdot Bmax + G2 \cdot Bmin + G3 \cdot Bmen + G4 \cdot Bup + G5 \cdot Bdwn + G6,$$

where

Bmax: the maximum value among five luminance value data divisionally photometered by the photometry element 19;

Bmin: the minimum value among five luminance value data divisionally photometered by the photometry element 19;

Bmen: the arithmetical mean value of five luminance value data divisionally photometered by the photometry element 19;

Bup: the arithmetical mean value of two data at the upside of the photometry element 19;

Bdwn: the arithmetical mean value of two data at the downside of the photometry element 19.

The discrimination between the upside and the downside is effected by the position detecting means 13.

Figure 15:
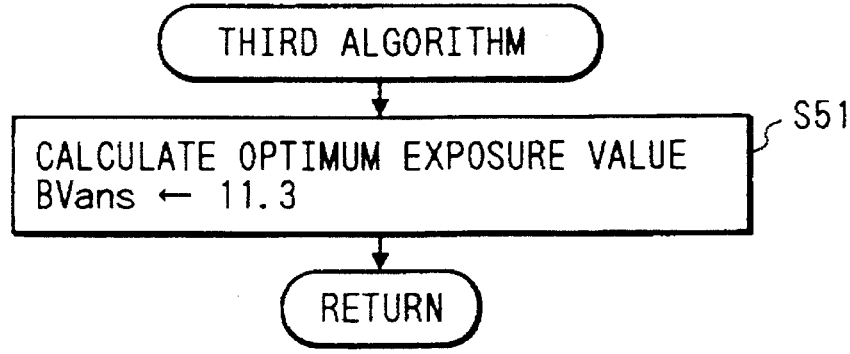
FIG. 15 is a detailed diagram of another example of the third algorithm.

FIG. 15 shows a second embodiment of the details of the third algorithm.

At a step S51, a preset predetermined value 11.3 BV is substituted as the optimum exposure value.

This method suffers from a disadvantage that accuracy is reduced as compared with the first embodiment, while on the other hand, it has an advantage that the photometry element 19 is unnecessary and therefore a reduction in cost can be achieved.

As described above, according to the present invention, in a photometry element of the type in which the outputs of photoelectric conversion portions such as CCDs are used in common and read, when very high luminance is incident on some of photoelectric conversion elements to cause an overflow and affects the outputs of that row or the areas around it, it is accurately detected and the affected outputs can be omitted in the calculation of exposure and therefore, even in such a case, it becomes possible to obtain optimum or nearly optimum exposure.

What is claimed is:

1. In an automatic exposure device in a camera in which an object field is divided into a plurality of areas forming a plurality of rows and photometered by the use of a divisional photometry element and optimum exposure is calculated from a result of the photometry, the improvement wherein said divisional photometry element includes a photoelectric converting portion for photoelectrically converting incident light in each row of said areas and putting out a plurality of outputs, and a reading portion for reading out the plurality of outputs of said photoelectric converting portion, and wherein when a number of successive outputs of a row of said areas in a readout direction which exceed a predetermined value is greater than a predetermined number, the outputs of that row are completely omitted in calculation of the optimum exposure.

2. The device of claim 1, wherein said photoelectric converting portion is of a charge accumulation type in which charges are accumulated for a predetermined time, and thereafter are read out.

3. The device of claim 1, wherein when the number of rows with omitted outputs exceeds a predetermined number, said divisional photometry element is not used for calculation of the optimum exposure.

4. The device of claim 3, wherein when he number of rows with omitted outputs exceeds a predetermined number, said calculation of the optimum exposure is effected by use of an output of a photometry element discrete from said divisional photometry element.

5. The device of claim 4, wherein said discrete photometry element is a photodiode.

6. An automatic exposure device in a camera comprising:

divisional photometry means for photometering an object field in each of a plurality of divisional areas, said photometry means including photoelectric conversion means for photoelectrically converting incident light in each of a plurality of areas forming a plurality of rows dividing the object field and putting out a plurality of photoelectric outputs, and reading means for successively reading out the plurality of photoelectric output in each row of said areas; and calculation means for calculating an optimum exposure value on the read-out photoelectric outputs;

wherein when a number of successive outputs of a row of said areas in a readout direction which exceed a predetermined value is greater than a predetermined number, said calculation means completely omits the outputs of that row in calculation of the optimum exposure value.

7. The device of claim 6, wherein said photoelectric conversion means is of a charge accumulation type in which charges are accumulated for a predetermined time, and thereafter are read out.

8. The device of claim 6, wherein when the number of rows with omitted outputs exceeds a predetermined number, said divisional photometry means is not used for calculation of the optimum exposure value.

9. The device of claim 8, wherein when the number of rows with omitted outputs exceeds a predetermined number, said calculation of the optimum exposure value is effected by use of an output of photometry means discrete from said divisional photometry means.

10. The device of claim 9, wherein said discrete photometry means is a photodiode.

11. In an automatic exposure device in a camera in which an object field is divided into a plurality of areas and photometered by the use of a divisional photometry element and optimum exposure is calculated from a result of the photometry, the improvement wherein said divisional photometry element includes a first photoelectric converting portion for photoelectrically converting incident light in each of said areas and putting out an output, a second photoelectric converting portion, having a surface shielded from light, for measuring a dark signal and putting out an output, and a reading portion for reading out the outputs of said first and second photoelectric converting portions in common, and wherein when the output from said second photoelectric converting portion exceeds a predetermined value, said divisional photometry element is not used for calculation of the optimum exposure.

12. The device of claim 11, wherein said photoelectric converting portions are of a charge accumulation type in which charges are accumulated for a predetermined time, and thereafter are read out.

13. The device of claim 11, wherein when the output from said second photoelectric converting portion exceeds said predetermined value, said calculation of the optimum exposure uses an output of a photometry element discrete from said divisional photometry element.

14. The device of claim 13, wherein said discrete photometry element is a photodiode.

15. The device of claim 11, wherein when the output from said second photoelectric converting portion exceeds said predetermined value, a preset value is used as the optimum exposure value.

16. An automatic exposure device in a camera comprising:

divisional photometry means for photometering an object field in each of a plurality of divisional areas, said divisional photometry means including photoelectric conversion means for photoelectrically converting incident light in each of a plurality of areas provided by dividing the object field and putting out an output, second photoelectric conversion means having a surface shielded from light, for measuring a dark signal and putting out an output, and reading means for reading out the outputs of said first and second photoelectric conversion means in common; and calculation means for calculating an optimum exposure value based on the read-out photoelectric outputs;

wherein when the output from said second photoelectric conversion means exceeds a predetermined value, said divisional photometry means is not used for calculation of the optimum exposure.

17. The device of claim 16, wherein said photoelectric conversion means are of a charge accumulation type in which charges are accumulated for a predetermined time, and thereafter are read out.

18. The device of claim 16, wherein when the output from said second photoelectric conversion means exceeds said predetermined value, said calculation of the optimum exposure value uses an output of photometry means discrete from said divisional photometry means.

19. The device of claim 18, wherein said discrete photometry means is a photodiode.

20. The device of claim 16, wherein when the output from said second photoelectric conversion means exceeds said predetermined value, a preset value is used as the optimum exposure value.

21. A photometry device in a camera comprising:

a plurality of first photoelectric converting portions for photometering an object field and putting out outputs;

a second photoelectric converting portion, having a surface shielded from light, for measuring a dark signal and putting out an output; and reading means for reading out the outputs of said first and second photoelectric converting portions in common;

wherein when the outputs of said photoelectric converting portions exceed a predetermined output, it is judged that the outputs of said plurality of first photoelectric converting portions are unreliable.

22. An automatic exposure device in a camera comprising:

a divisional photometry device for photometering an object field in each of a plurality of divisional areas, said photometry device including a photoelectric converter for photoelectrically converting incident light in each of a plurality of areas forming a plurality of rows of photoelectric converting elements dividing the object field and putting out a plurality of photoelectric outputs, and a reading device for successively reading out the plurality of photoelectric outputs in each row of said areas; and a calculator for calculating an optimum exposure value based on the read-out photoelectric outputs;

wherein when a number of successive outputs of a row of said areas in a readout direction which exceed a predetermined value is greater than a predetermined number, said calculator completely omits the outputs of that row in calculation of the optimum exposure value.

23. The device of claim 22, wherein said photoelectric converter is of a charge accumulation type in which charges are accumulated for a predetermined time, and thereafter are read out.

24. The device of claim 22, wherein when a number of rows with omitted outputs exceeds a predetermined number, said divisional photometry element is not used for calculation of the optimum exposure value.

25. The device of claim 24, wherein when the number of rows with omitted outputs exceeds said predetermined number, said calculation of the optimum exposure value is effected by use of an output of a photometry device discrete from said divisional photometry device.

26. The device of claim 25, wherein said discrete photometry device is a photodiode.

27. An automatic exposure device in a camera comprising:

a divisional photometry device for photometering an object field in each of a plurality of divisional areas, said divisional photometry device including a first photoelectric converter for photoelectrically converting incident light in each of a plurality of areas provided by dividing the object field and putting out an output, a second photoelectric converter having a surface shielded from light, for measuring a dark signal and putting out an output, and a reading device for reading out the outputs of said first and second photoelectric converters in common; and a calculator for calculating an optimum exposure value based on the read-out photoelectric outputs;

wherein when the output from said second photoelectric converter exceeds a predetermined value, said divisional photometry device is not used for calculation of the optimum exposure value.

28. The device of claim 27, wherein said photoelectric converters are of a charge accumulation type in which charges are accumulated for a predetermined time, and thereafter are read out.

29. The device of claim 27, wherein when the output from said second photoelectric converter exceeds said predetermined value, said calculation of the optimum exposure value uses an output of a photometry device discrete from said divisional photometry device.

30. The device of claim 29, wherein said discrete photometry device is a photodiode.

31. The device of claim 27, wherein when the output from said second photoelectric converter exceeds said predetermined value, a preset value is used as the optimum exposure value.

32. A photometry device in a camera comprising:

a plurality of first photoelectric converting portions for photometering an object field and putting out outputs;

a second photoelectric converting portion having a surface shielded from light, for measuring a dark signal and putting out an output; and a reading device for reading out the outputs of said first and second photoelectric converting portions in common;

wherein when the outputs of said photoelectric converting portions exceed a predetermined output, it is judged that the outputs of said plurality of first photoelectric converting portions are unreliable.

33. A method for automatic exposure in a camera under the control of a processor, comprising:

dividing an object field into a plurality of areas arranged in rows;

photometering the object field in each of the areas and producing outputs;

comparing the outputs produced in said photometering step with a predetermined value;

determining whether the number of successive outputs for a row which exceed the predetermined value, exceeds a predetermined number;

calculating an optimum exposure value on the basis of the outputs produced in said photometering step; and omitting from said calculating step, the outputs of any of the rows for which the number of successive outputs for the row which exceed the predetermined value, is greater than the predetermined number, thereby indicating that the row is affected by an overflow due to incident luminance.

* * * * *

UNITED STATES PATENT AND TRADEMARK OFFICE
CERTIFICATE OF CORRECTION

PATENT NO. : 5,664,242
DATED : September 2, 1997
INVENTOR(S) : Tadao Takagi

It is certified that error appears in the above-identified patent and that said Letters Patent is hereby corrected as shown below:

Column 10, line 13, "he" should be --the--;
line 27, "output" should be --outputs-.

Signed and Sealed this

Twenty-third Day of December, 1997

Attest:

BRUCE LEHMAN

Attesting Officer

Commissioner of Patents and Trademarks